Figures 1, 2:
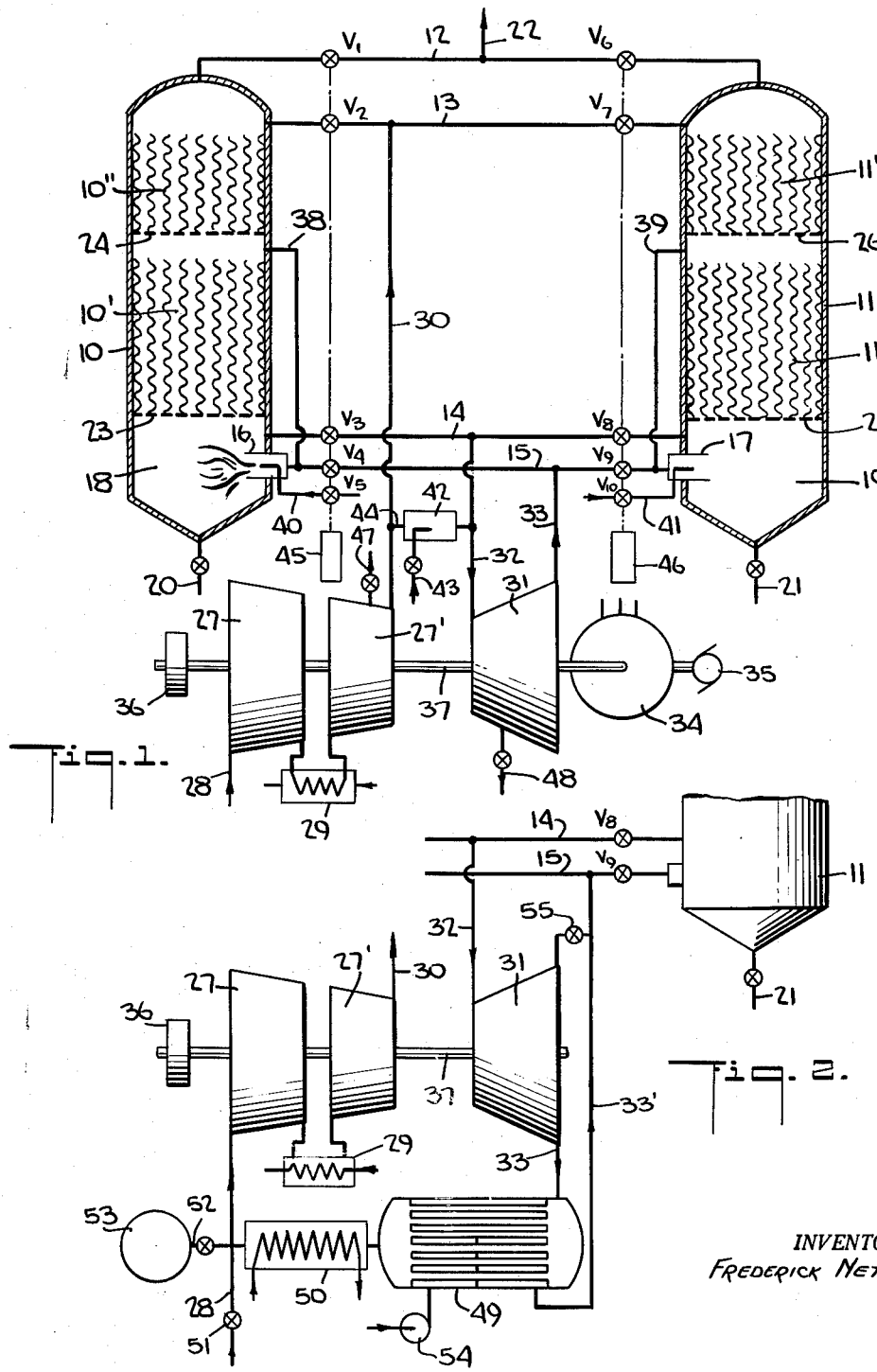

INVENTOR.
FREDERICK NETTEL

United States Patent Office 2,973,623
Patented Mar. 7, 1961

2,973,623
ELASTIC FLUID POWER PLANT WITH MATRICES OF SOLID MATERIAL FOR HEAT TRANSFER AND REGENERATION

Frederick Nettel, 173 Chapel Road, Manhasset, N.Y.

Filed Apr. 15, 1959, Ser. No. 806,630

8 Claims. (Cl. 60—39.51)

This invention deals with elastic fluid power plants involving solid material for heat transfer and regeneration.

The use of solid materials for heat storage is known per se from blast furnace and other metallurgical stoves, as well as for air heaters for boilers, known as Ljungstrom regenerative heaters. Modifications of the Ljungstrom heater are also used in gas turbine power plants. All these heat exchangers use matrices of heat storing materials of various types, bricks, metal sheets, wires for examples. Regenerative heaters with moving matrices, such as the Ljungstrom heaters, require moving seals between the hot and cold parts of these matrices which are subject to leakage where considerable pressure differences prevail between the gas and air streams. It is also difficult to obtain heat exchanger effectiveness much in excess of 70% because of mechanical difficulties in supporting the heavy rotating matrices, and the resulting high first cost.

It is the principal object of this invention to avoid these drawbacks by using a plurality of, at least two, matrices in such manner that while the first hot matrix discharges its heat into the stream of compressed air issuing from the compressor on its way to the air turbine, the second cold matrix is being heated by gases produced by fuel combustion in the still hot air issuing from said turbine, being discharged thereafter to the atmosphere. While the first matrix is being discharged, the second matrix is heated up, and by a suitable conduit and valve arrangement the operation of the matrices is reversed, so that the second matrix starts discharging while the first is being charged by fuel combustion in the air issuing from the turbine. This cycle is repeated indefinitely.

This and other more specific objects are achieved by this invention, as will be apparent from the following description and claims, taken in accordance with the accompanying drawing, forming a part of this application in which by way of non-limiting examples. Fig. 1 shows a simple embodiment of my invention using liquid or gaseous fuel. Fig. 2 indicates the parts necessary for a modification of the plant as per Fig. 1 so that the air turbine set operates on a closed cycle while it receives hot compressed air from one of the two matrices.

Reverting now in more detail to Fig. 1 of the drawing, in which 10 and 11 are closed shells of any desired cross section with heat insulation inside and/or outside to reduce heat losses by radiation or convection. The shells which may have any desired shape of cross section, preferably cylindrical, are shown with their axis in vertical position, but are not restricted to this position. At their first (upper) ends said two shells are connected by a conduit 12 with interposed valves $V_1$ and $V_6$ and a second conduit 13 with interposed valves $V_2$ and $V_7$. At their second (lower) ends said shells are connected by the conduit 14 with interposed valves $V_3$ and $V_8$ and by another conduit 15 with interposed valves $V_4$ and $V_9$. Said conduit 15 connects the two combustion chambers 16 and 17 which are disposed to discharge into the furnace spaces 18 and 19 provided at the second (lower) ends of the shells 10 and 11. At the lowest points of the furnace spaces valved conduits 20 and 21 may serve to discharge ash or slag from the furnaces 18 and 19. Branched off from the conduit 12 is conduit 22 which serves as stack for the exhaust gases.

Both shells 10 and 11 are for the most part of their lengths filled with matrices, 10' and 10" in shell 10, and 11' and 11" in shell 11. These matrices are supported by foraminous screens 23, 24, and 25, 26, respectively. The matrices may consist of any solid material of suitable mechanical strength able to withstand high temperatures and repeated heat shock, and having enough heat capacity to store large amounts of heat, for examples metals, alloys, carbides, alumina, bauxite, periclase, beryllia, Stellite.

It is essential for the purpose of this invention that the matrices shown minimum flow resistance to the air, gas or vapors flowing lengthwise through them. This is achieved by proper shaping or arrangement of the matrix material within the shells. Wires, rods or sheets of matrix material have been found satisfactory. Instead of two stacks of matrix material per shell, as shown in Fig. 1, only one stack or more than two may be used per shell.

Also shown in Fig. 1 is an air compressor consisting of a low pressure casing 27 and a high pressure casing 27' with air intake at 28, intercooler 29, and discharge conduit 30 which connects with the conduit 13. Further is shown an air turbine 31 with air intake conduit 32 branched off the conduit 15 and discharge conduit 33 which connects with conduit 15. The compressor 27, 27', the turbine 31, the electric generator 34, a starter motor 35 and a flywheel 36 are all mechanically coupled on a shaft 37.

Also branched off from the conduit 15 are conduits 38 and 39 which lead into the shells 10 and 11 into the spaces shown between the stacks 10', 10" and 11', 11" respectively.

The combustion chambers 16 and 17 are supplied with fuel via the fuel pipes 40 and 41 controlled by the valves $V_5$ and $V_{10}$ respectively, and another auxiliary combustion chamber 42 with fuel pipe 43 is interposed in the conduit 44 connecting the conduits 30 and 32. Any type of fuel, liquid, gaseous, pulverized may be used. The two groups of valves $V_1$ to $V_5$ and $V_6$ to $V_{10}$ are each controlled by its servomotor 45 and 46, respectively. The operating means connecting these servomotors with the individual valves are indicated only schematically by dotted lines.

The power plant as per Fig. 1 is started and operated as follows: For starting the starter motor 35 is energized thus starting the shaft 37 to rotate. All valves designated V are closed except $V_1$ and $V_4$. Air is taken in at 28 by the compressor and discharged through the auxiliary combustion chamber 42 where it is heated by combustion of fuel entering through tube 43. The hot compressed gas enters the turbine 31 via conduit 32, leaving via 33 and 15 for the combustion chamber 16, where more fuel, entering through tube 40 via valve $V_5$, is burned. The gas reheated in the furnace 18 flows upward through the matrices 10' and 10", thereby heating them, and leaves cold via valve $V_1$ through the stack 22 to the atmosphere. This is continued until the matrices are heated to the desired degree, say for example the matrix 10' at its lowest point to 900 deg. C. Now the servomotors 45 and 46 are put into operation in such manner that valves $V_1$, $V_4$ and $V_5$ are closed while $V_2$ is opened by servomotor 45, and the valves $V_7$, $V_8$ closed while the valves $V_9$ and $V_{10}$ are opened by the servomotor 46. Now the compressor 27, 27' forces the air to flow via valve $V_2$ into the shell 10, downward through the hot matrices 10'' and 10', out via the valve V₃, conduits 14 and 32 into the turbine 31 which it drives, so that the auxiliary combustion chamber 42 can be put out of operation by closing the cock in the fuel tube 43. The power plant can give now useful energy for driving the generator 34 or any other power consumer, as long as the air is heated sufficiently by the matrices. The length of time depends on the mass of the matrices. While the matrices in shell 10 are being cooled, the hot air issuing from the turbine 31, is lead via conduit 33, 15, valve V₉ into the combustion chamber 17 where by burning fuel, entering through valve V₁₀, the turbine exhaust is reheated in the furnace 19, flowing upwards through the matrices 11' and 11'' thus charging them, the cooled air being discharged via valve V₆ and the stack 22 to the atmosphere. When the matrix in shell 11 will be completely heated, the matrix in shell 10 will have been cooled and the servomotors provide for a reversal of the operation of the two shells by returning the valves to the same positions in which they were in during the first charging of the shell 10, as described before. This changeover continues indefinitely, allowing the plant to furnish power substantially constantly. Only during the actual short operation time of the two servomotors there may be a momentary interruption of power supply because the shell which has completed charging is under atmospheric pressure, and has to be brought up to the compressor pressure. This can take place within one or a few seconds by opening momentarily both valves in the conduit 13 so that the pressures in both shells can be equalized before bringing the shell which has to discharge next up to compressor pressure so that it can start supplying hot air to the turbine. This momentary drop in power can be avoided, or at least minimized, either by providing a flywheel 36 coupled to the shaft 37, or by starting the auxiliary combustion chamber 42 during the short changeover time.

Attention should also be drawn to the branch conduits 38 and 39 connecting the conduit 15 with the spaces between the matrices 10' and 10'' in shell 10, and 11' and 11'' in shell 11. The purpose of these conduits is to use only a portion of the exhaust air from the turbine for burning of fuel in the chambers 16 and 17 with a small air surplus to obtain very high furnace temperatures, and to use the rest of the air for preheating the matrices 10'' and 11'', respectively.

Due to the complete absence of tubular or plate-type recuperators and to the fact that essentially no combustion gases enter the turbine, it is possible to utilize very high temperatures at the turbine entrance and low grade fuels such as blast furnace gas, other waste gases, crude or residual liquid fuel and even coal. The plant as per Fig. 1 can also be used to provide compressed air for any purpose instead of, or simultaneously with, electric power. For this purpose air can be bled from the compressor, for example through the valved conduit 47, or the turbine through the valved conduit 48.

It is immaterial how many shells are used in a particular plant, it being only essential that while some of the shells are being discharged, others are being charged by combustion of fuel in the hot exhaust from the turbine or turbines used. It is also immaterial what design and arrangement is used for the compressors and turbines, whether they are arranged on one or several shafts, in parallel or series as regards to the flow of the air through them.

Fig. 2 shows only those parts which must be changed in plant as per Fig. 1 to make it operate on a closed power cycle. It can be seen that the air turbine 31 remains connected via conduit 32 to conduit 14. However, it discharges via conduit 33 into a tubular heat exchanger 49 and thence into a liquid-cooled aftercooler 50 from where it enters the compressor intake conduit 28, which in this case can be closed to the atmosphere by the valve 51. Further connected to the conduit 28 by the valved pipe 52 is a source of compressed air or other gas 53. The exhaust air from the turbine is cooled in 49 by air from a fan which, after being heated by heat exchange, is led via the conduit 33' into the conduit 15 and the combustion chambers 16 and 17 in sequence, in which it serves as preheated combustion air.

The plant modified as per Fig. 2 operates basically exactly like that as per Fig. 1, except that during the discharge of one matrix the cycle of air flow is closed by closing the valves 51 and 55 and the density of the air in the closed cycle can be varied by introducing compressed air from the source 53 via valve 52 as known per se. For changing back to open cycle operation, valves 51 and 55 are opened while valve 52 is closed.

Having now described and illustrated my invention, I wish it understood that my invention is not limited to the specific forms and arrangements of parts herein described and shown, or specifically covered by my claims;

What I claim is:

1. Elastic fluid power plant of the intermittent heating type using stationary matrices of solid material for storing heat and transferring heat to or from the working fluid, said plant comprising air turbo-compressor means, turbine type air expansion means, at least two closed shells each containing one or more matrices of solid material for alternatingly heating the compressed air issuing from the said compressor means by the matrix in one shell and for simultaneously heating the matrix in the other shell by combustion of fuel in expanded air issuing from said turbine expansion means, at least two furnace means one of which connected with each shell, at least two fuel burning combustion chambers, one each connected with one of said furnaces, first valved conduit means for connecting the stack with the upper ends of both shells, stack conduit means for connecting said first conduit to the atmosphere, second valved conduit means for connecting the stack end of both shells, third valved conduit means for connecting the lower (furnace) ends of both shells, fourth valved conduit means for connecting the said two fuel burning combustion chambers, fifth valved means for supplying fuel to the said two combustion chamber means from a source external to the plant, sixth conduit means for connecting the outlet of said compressor means to said second valved conduit, seventh conduit means for connecting the third valved conduit with the inlet to said expansion turbine means, eighth conduit means for connecting the outlet of said expansion turbine means with the said fourth valved conduit means, mechanical coupling means for connecting said compressor means to said turbine expansion means for driving said compressor, and mechanical coupling means connecting said turbine expansion means to power consuming means for driving same.

2. Elastic fluid power plant as set forth in claim 1, having auxiliary fuel burning combustion chamber means interposed in a conduit connecting said sixth conduit means with said third valved conduit means, for starting and regulating the power plant.

3. Elastic fluid power plant as set forth in claim 1, having a flywheel connected to said turbine expansion means for maintaining power delivery during changeover of matrix heating from one shell to another.

4. Elastic fluid power plant as set forth in claim 1, having two servomotor means for controlling the valves in the first to fifth conduits in predetermined sequence alternatingly in two groups, one of the servomotors controlling the inlets and outlets to and from one shell, while the other servomotor controls the inlets and outlets to and from the other shell.

5. Elastic fluid power plant as set forth in claim 1, for operation as a closed cycle power plant, having valved inlet conduit means for the air compressor means, recuperative heat exchanger means connected on the heating side to said outlet of said expansion turbine, cooler means for the said turbine exhaust interposed in conduit means leading from the outlet of said heat exchanger to the valved inlet conduit of said air compressor means, air fan means for providing an air stream through the heated side of said heat exchanger for preheating said air stream and conduit means for discharging said hot air stream into said fourth valved conduit means for use as combustion air in the said two fuel burning combustion chambers.

6. Elastic fluid power plant as set forth in claim 5, having a source of compressed air or gas, valved conduit means for connecting said source to the inlet conduit of said compressor means for raising the pressure level of the elastic fluid circulating through the plant and therefore the output of the plant.

7. Elastic fluid power plant as set forth in claim 1, having air compressor means of the multi-stage type, and conduit means disposed to withdraw compressed air from said compressor at points after part-compression in the first stage, for use by a consumer outside of the said power plant.

8. Elastic fluid power plant as set forth in claim 1, having expansion turbine means of the multi-stage type, and conduit means disposed to withdraw hot air from said expansion means between stages of expansion, for use by a consumer outside of the said power plant.

No references cited.